(12) United States Patent
Jeppesen et al.

(10) Patent No.: US 8,221,076 B2
(45) Date of Patent: Jul. 17, 2012

(54) METHOD OF CONTROLLING THE PITCH VELOCITY OF A WIND TURBINE BLADE AND CONTROL SYSTEM THEREFORE

(75) Inventors: Ole Mølgaard Jeppesen, Risskov (DK); John Bengtson, Højbjerg (DK); Torben Møller Hansen, Hornslet (DK)

(73) Assignee: Vestas Wind Systems A/S, Aarhus (DK)

( * ) Notice: Subject to any disclaimer, the term of this patent is extended or adjusted under 35 U.S.C. 154(b) by 0 days.

(21) Appl. No.: 12/909,601

(22) Filed: Oct. 21, 2010

(65) Prior Publication Data

US 2011/0040413 A1 Feb. 17, 2011

Related U.S. Application Data

(63) Continuation of application No. 11/658,385, filed as application No. PCT/DK2004/000512 on Jul. 23, 2004, now Pat. No. 7,891,944.

(51) Int. Cl.
*F03D 11/00* (2006.01)

(52) U.S. Cl. ............ 416/1; 416/30; 416/37; 416/41; 416/61; 416/153; 290/44; 290/55

(58) Field of Classification Search ............ 416/1, 30, 416/37, 41, 61, 153; 290/44, 55
See application file for complete search history.

(56) References Cited

U.S. PATENT DOCUMENTS

| 5,418,446 A | 5/1995 | Hallidy |
| 5,584,655 A | 12/1996 | Deering |
| 6,137,187 A | 10/2000 | Mikhail et al. |
| 6,327,957 B1 * | 12/2001 | Carter, Sr. ............ 416/159 |
| 6,670,721 B2 | 12/2003 | Lof et al. |
| 2004/0094964 A1 | 5/2004 | Mikhail et al. |

FOREIGN PATENT DOCUMENTS

| DE | 3106624 A1 | 9/1982 |
| EP | 0942168 A2 | 9/1999 |
| EP | 1286048 A1 | 2/2003 |

OTHER PUBLICATIONS

International Preliminary Report on Patentability; PCT/DK2004/000512; Nov. 7, 2006; 11 pages.
International Search Report; PCT/DK2004/000512; Mar. 29, 2005; 3 pages.
Written Opinion of the International Searching Authority; PCT/DK2004/000512; Jan. 23, 2007; 6 pages.
European Search Report; Application No. EP 10 00 4311; Jan. 6, 2011; 5 pages.
Bossanyi, E A; "The Design of Closed Loop Controllers for Wind Turbines"; Wiley, vol. 3, No. 3, Jan. 1, 2000; pp. 149-163.

* cited by examiner

*Primary Examiner* — Igor Kershteyn
(74) *Attorney, Agent, or Firm* — Wood, Herron & Evans, LP (57) ABSTRACT

A method of controlling at least one wind turbine blade during the stopping process of the rotor in a wind turbine system is disclosed. The method optimizes the control velocity of the process in response to one or more feedback values of the system and/or one or more feedback values from the surroundings of the system by altering the angular pitch velocity from 10°/sec during the initial stage of the stopping process to 5°/sec at the final stage of the stopping process. A control system and a wind turbine as well as use hereof are also disclosed.

19 Claims, 8 Drawing Sheets

METHOD OF CONTROLLING THE PITCH VELOCITY OF A WIND TURBINE BLADE AND CONTROL SYSTEM THEREFORE

CROSS-REFERENCE TO RELATED APPLICATIONS

This application is a continuation of U.S. patent application Ser. No. 11/658,385 filed Sep. 25, 2007 now U.S. Pat. No. 7,891,944, which is the National Stage of International patent application PCT/DK2004/000512 filed on Jul. 23, 2004 which designated the United States. The content of all prior applications is incorporated herein by reference.

FIELD OF THE INVENTION

The invention relates to method of controlling at least one wind turbine blade during stopping process of the rotor in a wind turbine system, control system, wind turbine and use hereof.

BACKGROUND OF THE INVENTION

The stopping process may be initiated in order to avoid overload situations for a wind turbine, for example, if the electric generator of the wind turbine suddenly is disconnected from the utility grid.

Previously, wind turbine blades of a wind turbine have been controlled during a stopping process by using pre-established values for the pitch velocity until the blades are fully pitched out of the wind.

The pitch control systems mainly comprise mechanical and hydraulic components such as hydraulic actuators to turn the wind turbine blades in or out of the wind around their longitudinal axis.

A problem with the prior art is that the values for the pitch velocity have to be picked conservatively in order to ensure that any part of the wind turbine, and especially the blades, do not experience an overload situation from the controlling during the stopping process. However, if the stopping process is to slow, the generator and gear means of the wind turbine may suffer damage.

A related problem is that the wind turbine, and especially the blades, have to be dimensioned quite robust in order to survive any force during the stopping process in which the process is prolonged by the low pitch velocity.

A further problem is the fact that the rotor may get out of control, i.e., accelerate to fatal speeds due to the low pitch velocity.

An object of the invention is to establish a technique without the above-mentioned disadvantages. Especially, it is an object to establish solutions which are optimal in connection with the stopping process of wind turbine rotors and especially rotors of large modern wind turbines without causing damage to the wind turbines.

SUMMARY OF THE INVENTION

The invention relates to a method of controlling at least one wind turbine blade during the stopping process of the rotor in a wind turbine system, for example, during extreme situations such as loss of a utility grid or high wind, where the method optimizes the blade control velocity of the blades at least toward a position of no-acceleration force facc applied to the rotor in response to one or more feedback values of the system and/or the surroundings of the system.

Hereby is established a method without the above-mentioned disadvantages of the prior art. Especially, it is advantageous that the method allows the rotor of the wind turbine to be optimally and actively stopped in response to feedback values of the wind turbine and/or the surroundings of the wind turbine. The active control of the wind turbine blades allows the wind turbine to be stopped quickly without exposing the wind turbine to excessive forces, i.e., an optimizing between time and forces in stopping the rotor.

The method is particularly advantageous in connection with the long and heavy wind turbine blades of modern wind turbines in which the possible excessive forces are quite significant.

Consequently, the method allows the wind turbine, including the rotor system, to be dimensioned less robust than normal as the wind turbine will not undergo considerable and potentially harmful forces during the optimal and swift stopping process.

In an aspect of the invention, the controlling includes the regulating of the pitch angle of one or more pitch or active stall wind turbine blades from the value at the initiating of the stopping process, to a value of the no-acceleration position, for example, to substantially 90 degrees. To optimize the pitch control of the blades in the period from the beginning of the stopping process to the blade position of no-acceleration is established, is especially advantageous as the blade forces in this period are potentially damaging to the wind turbine if they not are brought under control quickly, for example, due to increasing rotor speed during the period. The rotor speed is contained and again under control when the no-acceleration position is reached.

In a further aspect of the invention, the regulating of the teeter angle of a rotor teeter mechanism is used in obtaining the no-acceleration of the at least one wind turbine blade. The teeter mechanism allows blade load-shedding during every rotation of the wind turbine blades in response to asymmetric wind speeds over the swept area with the use of a bearing at the rotor hub. The teeter angle is an important measuring data during the stopping process as no control of the teeter mechanism may result in unintended forces applied to the blades, impact between the blades and the tower, as well as overload of the teeter mechanism.

In a further aspect of the invention, the controlling includes a closed loop configuration with the feedback values established by measuring mechanical or physical data of the system and/or the surroundings of the system such as measuring data of pitch position, blade load, teeter angle, azimuth, friction of blade bearings, wind speed, wind direction, wind shear and/or wind density. Hereby, it is possible to quickly pitch the wind turbine blades to a no-acceleration position and thus reduce a rotor overspeed and without overloading the wind turbine and the blade structure. Consequently, the feedback values ensure that a fatal breakdown of the wind turbine is avoided as the critical component of the wind turbine and the surroundings are monitored and fed back to the blade control system.

The phrase "mechanical or physical data" should be understood as measuring data not concerning the generated electrical power output of the wind turbine system or other measurements relating to power generation during normal periods of power generation.

In an even further aspect of the invention, the pitch velocity is controlled in relation to a non-linear curve with a higher initial slope. Hereby, it is possible to overcome any inertia and pitch the blade quickly out of the wind. The pitching may be performed closer to the physical limits of the wind turbine and especially the rotor system as the necessary data are measured, fed back, and used in the continuous pitching out of the blades from the wind. Further, the velocity may be limited to a low value when the feedback values indicate that In an aspect of the invention, the controlling of the pitch velocity comprises high initial transient from 0 to circa 15 degrees/sec in the first few seconds e.g. in the first five seconds such as between the first and third second. Hereby is an advantageous embodiment of the invention achieved and especially in connection with modern wind turbine blades of a length beyond 30 meters e.g. blades of 39 or 44 meters and with a weight of at least 5 tons.

In another aspect of the invention, the one or more feedback values result in control values for controlling the at least one wind turbine blade within control limit values. Hereby, the wind turbine blades may be pitched with a high initial velocity and a lower succeeding velocity in response to the feedback values and thus establishing a non-linear velocity curve.

In another aspect of the invention, the pitch angles of the at least one wind turbine blade are controlled individually during every rotation of the rotor in order to obtain a substantially common force on the rotor. Hereby, the rotor may be protected against asymmetric and potentially fatal forces during every rotation in the stopping process.

In another aspect of the invention, the pitch angles of the at least one wind turbine blade are controlled in relation to a cyclic or a similar non-linear curve during every rotation of the rotor, for example, in relation to the wind speed in different sections of the swept area. Hereby, the wind turbine may be protected against damage due to fatal forces arising from asymmetric wind forces over the swept area, unbalances in the rotor, and/or the rotor control systems.

It should be understood that the pitch angle is controlled in relation to feedback values in order to deal with non-linear situations during every rotation of the rotor and thus follows the non-linear curve but is not controlled along a curve as such.

The invention further relates to a control system for controlling at least one wind turbine blade during the stopping process of the rotor in a wind turbine system, for example, during extreme situations such as loss of a utility grid or high wind, wherein the system comprises sensor means to measure one or more values of the system and/or the surroundings of the system, computing means to establish one or more feedback values of the measured values, and control means to control the at least one wind turbine blade wherein said means optimizes the blade control velocity of the blades at least toward a position of no-acceleration force $f_{acc}$ applied to the rotor in response to the one or more feedback values.

Hereby is established a control system without the above-mentioned disadvantages of the prior art. Especially, it is advantageous that the control system allows the wind turbine to be actively stopped in response to feedback values. The active control of the wind turbine blades allows the wind turbine to be stopped quickly without exposing the wind turbine to excessive forces, i.e., an optimizing between time and forces during the stopping process.

The control system is particularly advantageous in connection with long and quite heavy wind turbine blades of modern wind turbines. Further, modern wind turbines and especially wind turbine blades may be designed without the standard over-dimensioning in order to survive extreme situations as the control system may stop the wind turbines before they face excessive forces.

In aspects of the invention, the control means comprises means and algorithms such as pitch actuator systems for controlling the pitch from the initiating value of the stopping process to a value of the no-acceleration position, for example, of 90 degrees of the at least one wind turbine blade such as one or more pitch or active stall wind turbine blades and/or a teeter mechanism that is used in obtaining the no-acceleration of the at least one wind turbine blade.

In another aspect of the invention, the sensor means include pitch position sensors, blade load sensors, azimuth sensors, wind sensors, and/or teeter angle sensors for measuring mechanical or physical data of the wind turbine system and/or the surroundings of the system. Hereby is an advantageous embodiment of the invention achieved by establishing the relevant and necessary values of the wind turbine and surroundings to be used in the algorithms as feedback values during the stopping process.

In a further aspect of the invention, the system includes a closed loop configuration in order to establish the one or more feedback values. Hereby is an advantageous embodiment of the invention achieved.

In another aspect of the invention, the control means comprises means for controlling the pitch velocity in relation to a non-linear curve with a higher initial slope. Hereby is an advantageous embodiment of the invention achieved.

In an aspect of the invention, the control means comprises means for controlling the pitch velocity with a high initial transient from 0 to circa 15 degrees/sec in the first few seconds, for example, in the first five seconds such as between the first and third second. Hereby is an advantageous embodiment of the invention achieved.

In an aspect of the invention, the system controls the at least one wind turbine blade within control limit values. Hereby is an advantageous embodiment of the invention achieved.

In a further aspect of the invention, the computing means includes microprocessor and computer storage means, for example, for pitch algorithms and pre-established values of the control limit values. The use of computing means in the control means and in combination with swiftly reacting pitch actuator systems allow the wind turbine blades to be turned out of the wind without being damaged during the turning.

The invention also relates to a wind turbine with at least one pitch or active stall wind turbine blade in the rotor, and a control system for controlling a pitch actuator system and the pitch angle of the at least one wind turbine in response to one or more feedback values of the wind turbine and/or the surroundings of the wind turbine during a stopping process.

In aspects of the invention, the at least one wind turbine blade is part of a wind turbine with two or three blades and the pitch actuator system includes electric motors, for example, electric stepper motors controlling the pitch angle of the at least one wind turbine blade. The use of electric motors allows the creation of precise and swiftly reacting pitch actuator systems which is advantageous in connection with the present invention.

In other aspects of the invention, the wind turbine comprises a rotor teeter mechanism and the pitch actuator system controls the pitch angles of the at least one wind turbine blade individually during every rotation of the rotor in order to obtain a substantially common force on the rotor.

In further aspect of the invention, the pitch actuator system controls the pitch angles of the at least one wind turbine blade in relation to a cyclic or non-linear curve during every rotation of the rotor, for example, in relation to the wind speed in different sections of the swept area.

BRIEF DESCRIPTION OF THE DRAWINGS

The invention will be described in the following with reference to the figures in which.

DETAILED DESCRIPTION OF THE INVENTION

Figure 1:
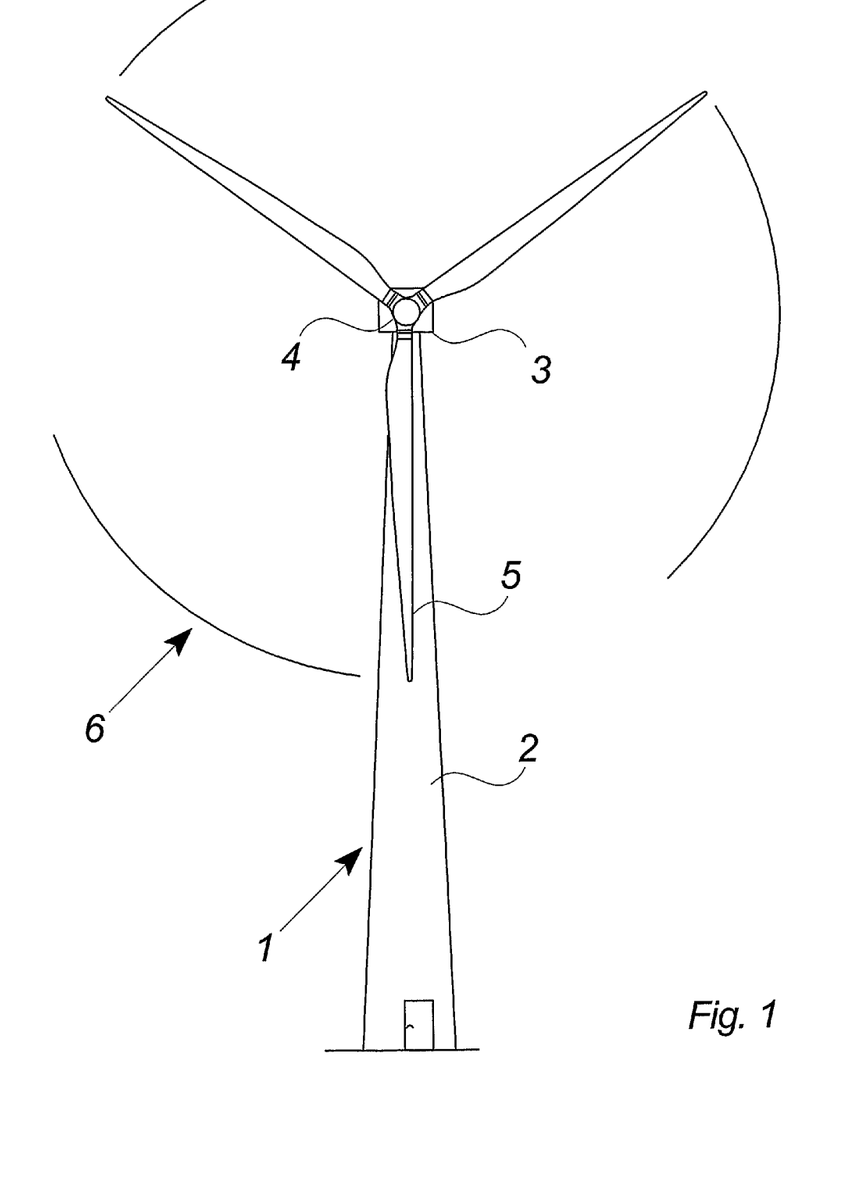
FIG. 1 illustrates a large modern wind turbine including three wind turbine blades in the wind turbine rotor.

FIG. 1 illustrates a modern wind turbine 1 with a tower 2 and a wind turbine nacelle 3 positioned on top of the tower. The blades 5 of the wind turbine rotor are connected to the nacelle through the low speed shaft which extends out of the nacelle front.

As illustrated in the figure, wind over a certain level will activate the rotor and allow it to rotate in a perpendicular direction to the wind. The rotation movement is converted to electric power which usually is supplied to the transmission grid as will be known by skilled persons within the area.

Figure 2:
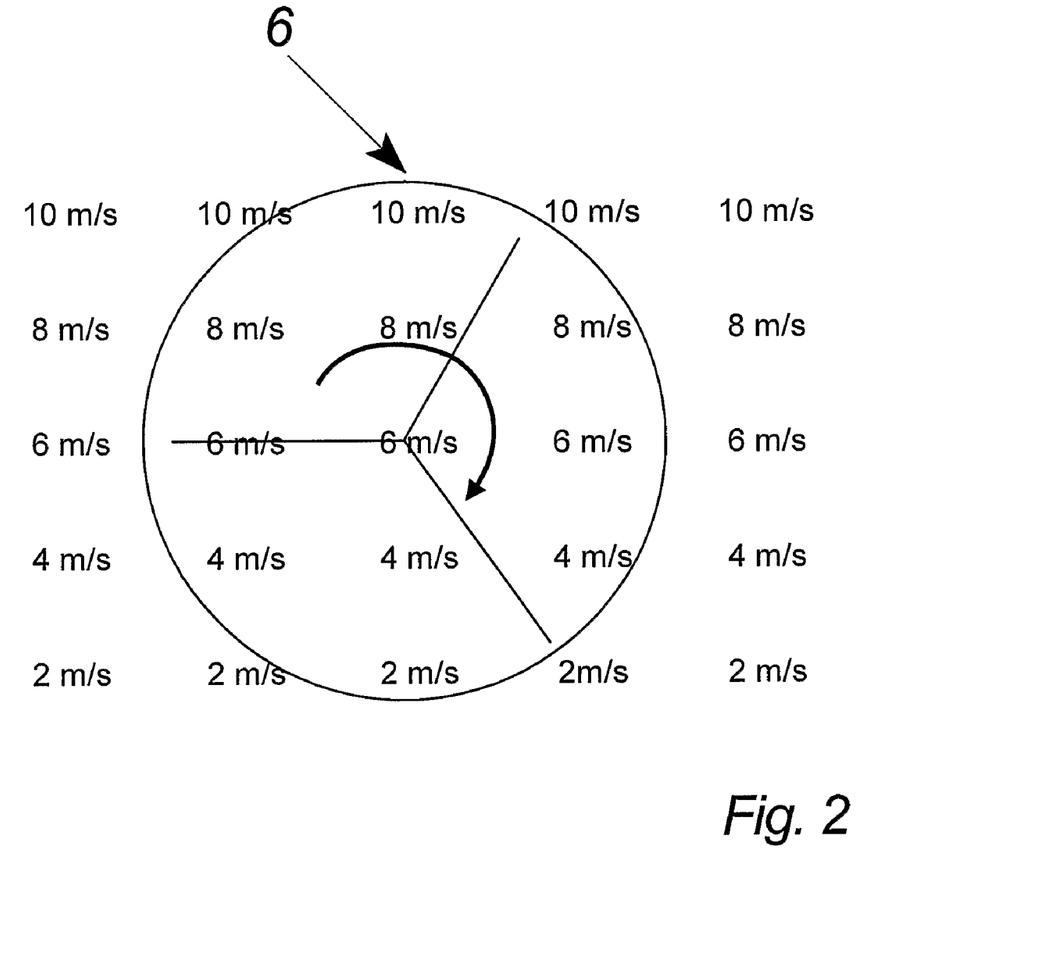
FIG. 2 illustrates an example of the wind force distribution that the wind turbine rotor faces during rotation.

FIG. 2 illustrates the distribution of the wind forces which the large rotor 6 faces e.g. strong wind forces at the top of the rotor (e.g. 10 meter per second) and decreasing wind forces (e.g. from 8 to 2 meter per second) toward the bottom of the rotor. The rotor faced distribution of wind forces may result in a very strong moment on the wind turbine in which the wind forces literally try to break off the nacelle from the tower or the foundation. The wind turbine blades are controlled individually in order to level the distribution of wind forces i.e. pitched less into the wind at the top than at the bottom of the rotating movement performed by the rotor including the blades. This technique is called cyclic pitch of the wind turbine blades i.e. a cyclic change of the pitch angle during a full rotation of a blade.

The asymmetric wind forces may arise or be increased by wind shear or wind wake from other wind turbines in a wind park or from meteorological or geographical conditions.

Figure 3:
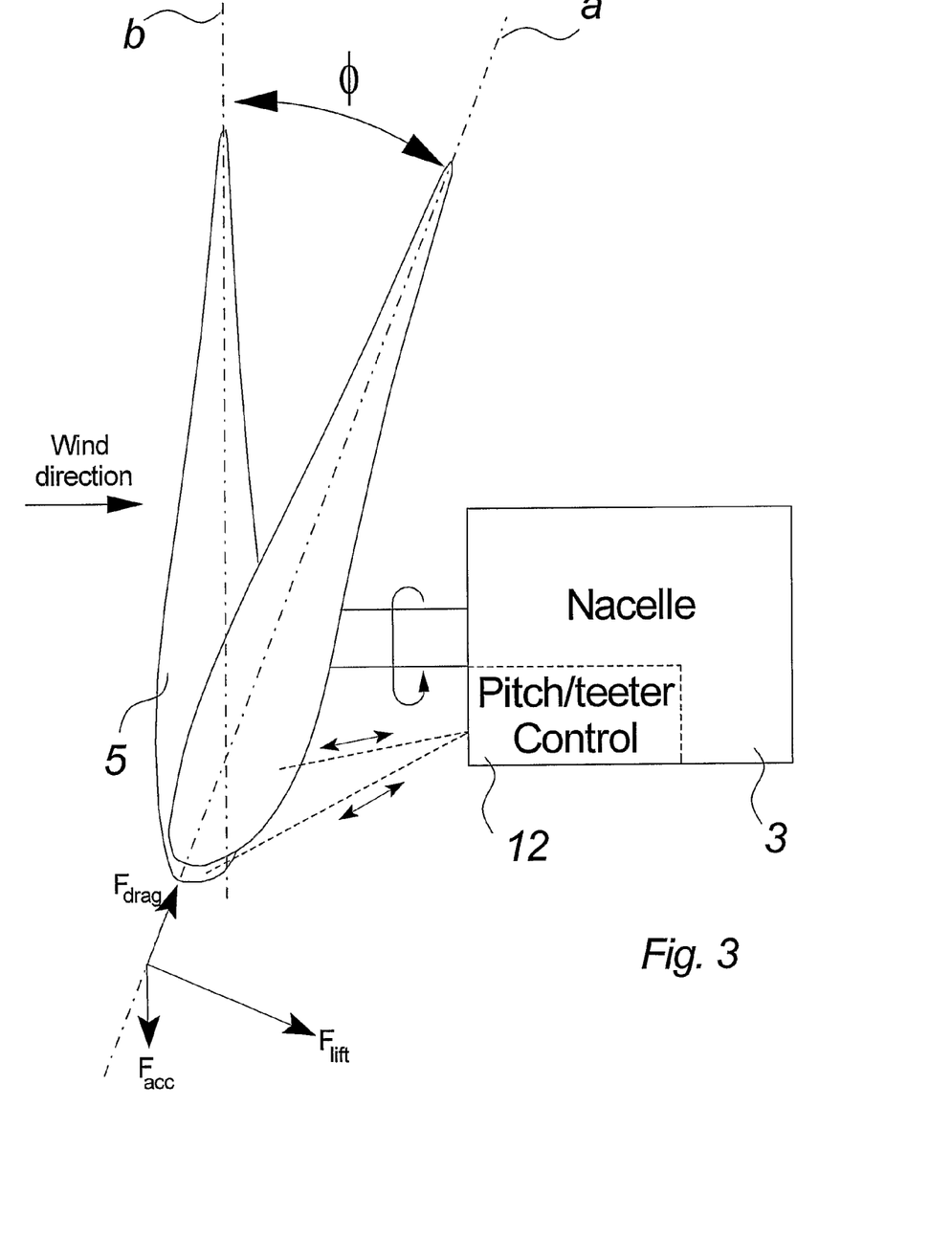
FIG. 3 illustrates schematically the functionality of a pitch system in a pitch controlled wind turbine.

FIG. 3 illustrates schematically the functionality of a pitch system in a pitch controlled wind turbine. The turbine is illustrated with just one wind turbine blade 5. The blade is illustrated in two positions in relation to the wind direction; a work position "a" and a no-acceleration or no-energy position "b", respectively, and (not illustrated) a parking position. The blade is in the position b pitched or turned out of the wind around its longitudinal axis to such extent that an acceleration force $f_{acc}$ is zero, i.e., a no-acceleration position for the wind turbine rotor. The position a illustrates the wind turbine blade 5 in any normal working position in which the blade has been pitched or turned into the wind whereby the wind establishes lifting forces on the blade making the wind turbine rotor and the shaft rotate. The angle [phi] is the angle from the positions a through b to the parking position and thus the angle from a given working position through the no-acceleration position to the parking position i.e. the angle which the wind turbine blade must be pitched during a stopping process such as an emergency stop of a wind turbine in order to protect it by removing forces from the blade (and thus the rest of the wind turbine).

The wind affects the blade profile of the wind turbine blade with an orthogonally directed force $F_{lift}$ and a parallel directed force $F_{drag}$ on the blade profile. There is a force surplus and the wind turbine blade will accelerate if the sum of vector components points forward. And decelerate if the sum of vector components points backward.

Figure 4:
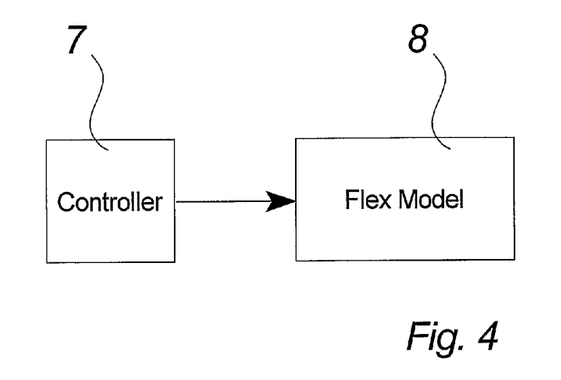
FIGS. 4 and 5 illustrate the functionality and pitch velocity of a well-known control system for controlling the wind turbine blades.
Figure 5:
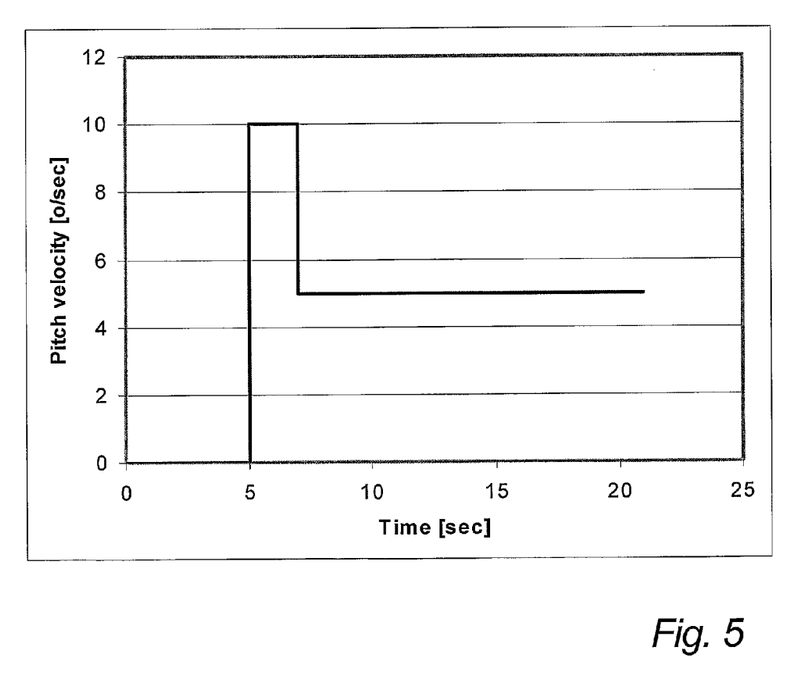

FIGS. 4 and 5 illustrate the functionality of a previous control system for controlling the wind turbine blades.

FIG. 4 illustrates schematically how a controller 7 controls the flex model 8 representing a pitch controlled wind turbine blade 5 of the rotor 6 in a wind turbine 1 during the stopping process. The continuously variable pitch may operate with an angle φ between 0 and 90 degrees in which the parking position represents the wind turbine blade being substantially out of the wind.

From the normal operating position to the parking position is the angle φ which the wind turbine blade must be turned in order to stop the rotor from rotating. The angular velocity defines the pitch time from an operating position to a parking position of the wind turbine blade.

The blade pitching of the wind turbine system is normally carried out by a hydraulic system with tank and pumps placed in the nacelle, whereas servo valve and cylinders are placed in the hub. The cylinders are provided with pressurized oil through the hollow low-speed shaft and a rotating oil inlet. The control of the hydraulic system is usually established by a system of electric relays.

FIG. 5 illustrates an example of a curve relation of applied force to achieve an angular pitch velocity over time in connection with the controller of FIG. 4, i.e., a curve over the acceleration of the system.

The curve comprises a first and second level of applied force to the wind turbine blade in which the first level is higher than the second in order to initiate the pitching of the blade and resulting in a substantially linear or constant angular pitch velocity from an operating position to a no-energy or parking position. The levels are chosen rather conservatively with a significant margin to any level that may cause damage to the wind turbine blade or the other wind turbine components.

The o/sec on the figure should be understood as °/sec, i.e., degrees per second.

Figure 6:
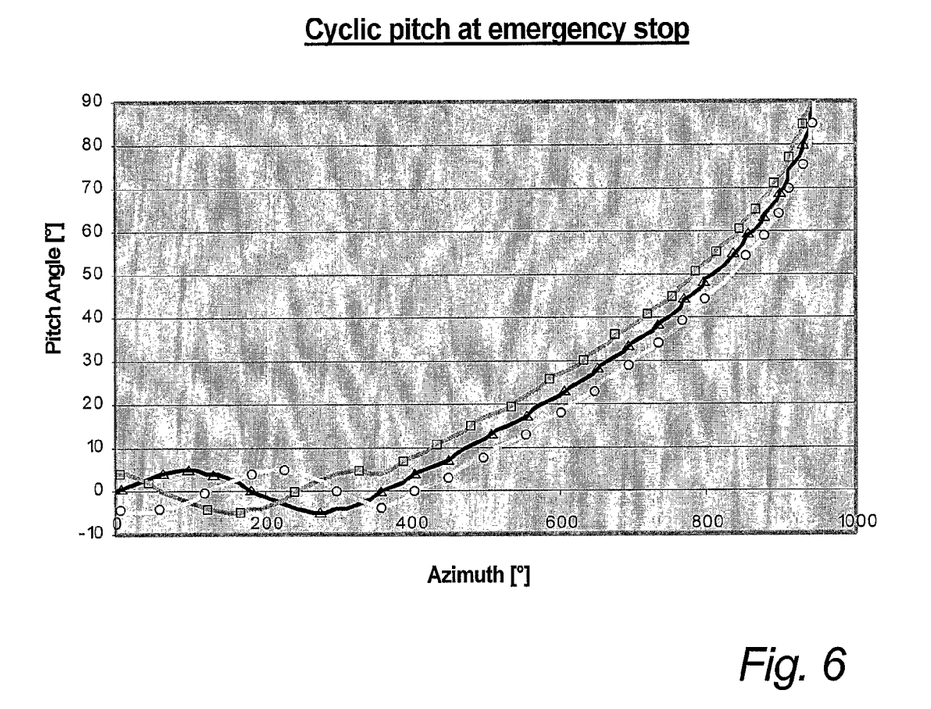
FIG. 6 illustrates the pitch angle control strategy of a control system for controlling the wind turbine blades.

FIG. 6 illustrates the pitch angle control strategy of a control system for controlling the wind turbine blades in a wind turbine rotor as illustrated in FIG. 4. Each of the three curves illustrates the behavior of a wind turbine blade during a normal and a stopping period of the rotor in which the stopping process starts at circa 360 degrees, i.e., one rotor rotation after curve start and circa one and a half rotor rotation before a pitch angle of 90 degrees is reached.

The strategy comprises pitching in relation to the wind speed over the swept area whereby the pitch angle is changed cyclic in every rotation of the rotor, i.e., the blades are swept in and out of the wind during a rotation. When the stopping process of the rotor is started the blades are pitched as illustrated in FIGS. 4 and 5, i.e., with a linear pitch velocity over time forcing the blades to follow the illustrated curves in FIG. 6.

Figure 7:
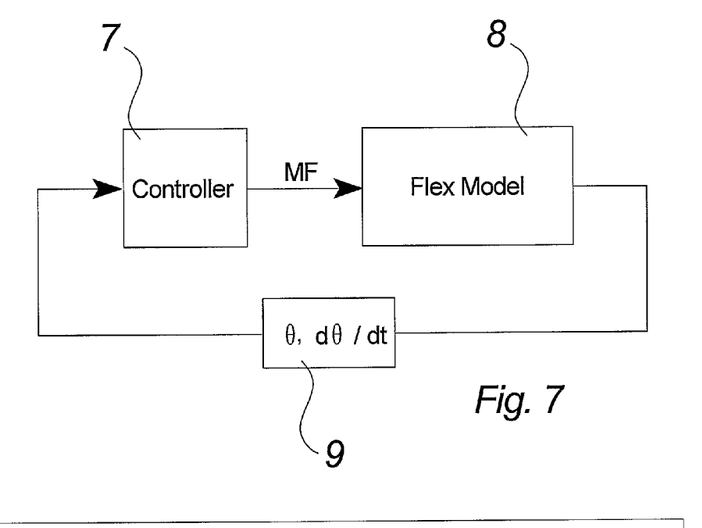
FIGS. 7 and 8 illustrate the functionality and pitch velocity of a control system for controlling the wind turbine blades according to the invention.
Figure 8:
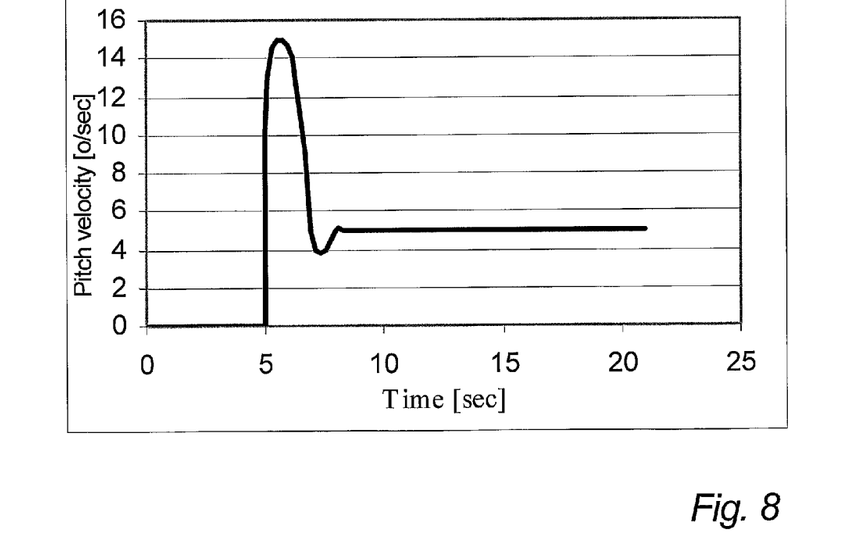

FIGS. 7 and 8 illustrate the functionality and pitch velocity of a control system for controlling the wind turbine blades according to the invention.

FIG. 7 illustrates schematically how a controller 7 controls the flex model 8 representing a pitch controlled wind turbine blade 5 of the rotor 6 in a wind turbine 1 during the stopping process. The controller 7 optimizes the pitch velocity of the wind turbine blades during the stopping process in response to one or more feedback values from feedback means 9. The feedback values are established by sensors in the wind turbine system 1 and/or at the surroundings of the wind turbine system 1. The sensors of the surroundings may detect or monitor the wind speed, wind direction, wind shear and/or wind density as well as other relevant values of the surroundings.

FIG. 8 illustrates an example of a curve relation of applied force to achieve an angular pitch velocity over time of the present invention, i.e., a curve over the acceleration of the system.

The curve includes an initial high transient acceleration from 0 to circa 15 degrees/sec in the first few seconds, e.g., in the first five seconds such as between the first and third second. The curve forms a steady-state after the initial transitory condition in which a no-acceleration position is reached. Hereby is assured that the angular pitch velocity has a high initial value and a lower succeeding value and thus forms a non-linear velocity curve.

The wind turbine may in an emergency situation (e.g., loss of utility load on the electric generator in which a fatal rotor runaway is imminent or high wind situations) be stopped by quickly pitching the wind turbine blades to a "dynamic stability position" in which the force accelerating the blades Facc is zero (the no-acceleration position). The blades may hereafter be brought to a full stop in a slower pace. The necessary pitch angle for obtaining dynamic stability depends on different wind speeds but is typically circa 10-15°. The wind turbine blades should be pitch individually in order to overcome any unbalance in the rotor, e.g., one blade with a slower reacting pitch system than the other blade or blades. The correct approach in this situation may for example be to slow down the other blade pitch systems in order to avoid any structural damage to the wind turbine due to unbalance in the rotor. The stopping process of the wind turbine may hereafter continue as the necessary rotor balance is achieved.

The o/sec on the figure should be understood as °/sec i.e. degrees per second.

Figure 9:
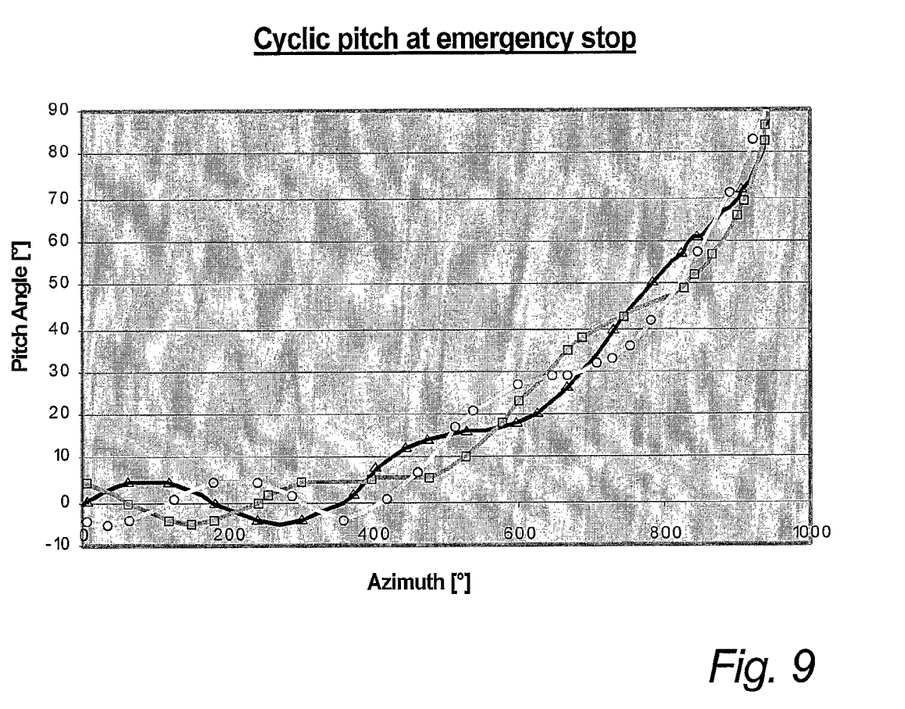
FIG. 9 illustrates a pitch angle control strategy of a control system as illustrated in FIG. 7.

FIG. 9 illustrates a preferred pitch angle control strategy of a control system as illustrated in FIG. 7.

Each of the three curves illustrates the behavior of a wind turbine blade during a normal and a stopping period of the rotor in which the stopping process starts at circa 360 degrees i.e. one rotor rotation after curve start and circa one and a half rotor rotation before a pitch angle of 90 degrees is reached.

The strategy comprises pitching in relation to the wind speed over the swept area whereby the pitch angle is changed cyclic in every rotation of the rotor, i.e., the blades are swept in and out of the wind during a rotation. When the stopping process of the rotor is started the blades are pitched as illustrated in FIGS. 7 and 8 with a non-linear pitch velocity over time and feedback values allowing the pitch angle of the blades to follow the optimal curves as illustrated in FIG. 9, e.g., with a cyclic pitch in the stopping process.

Figure 10:
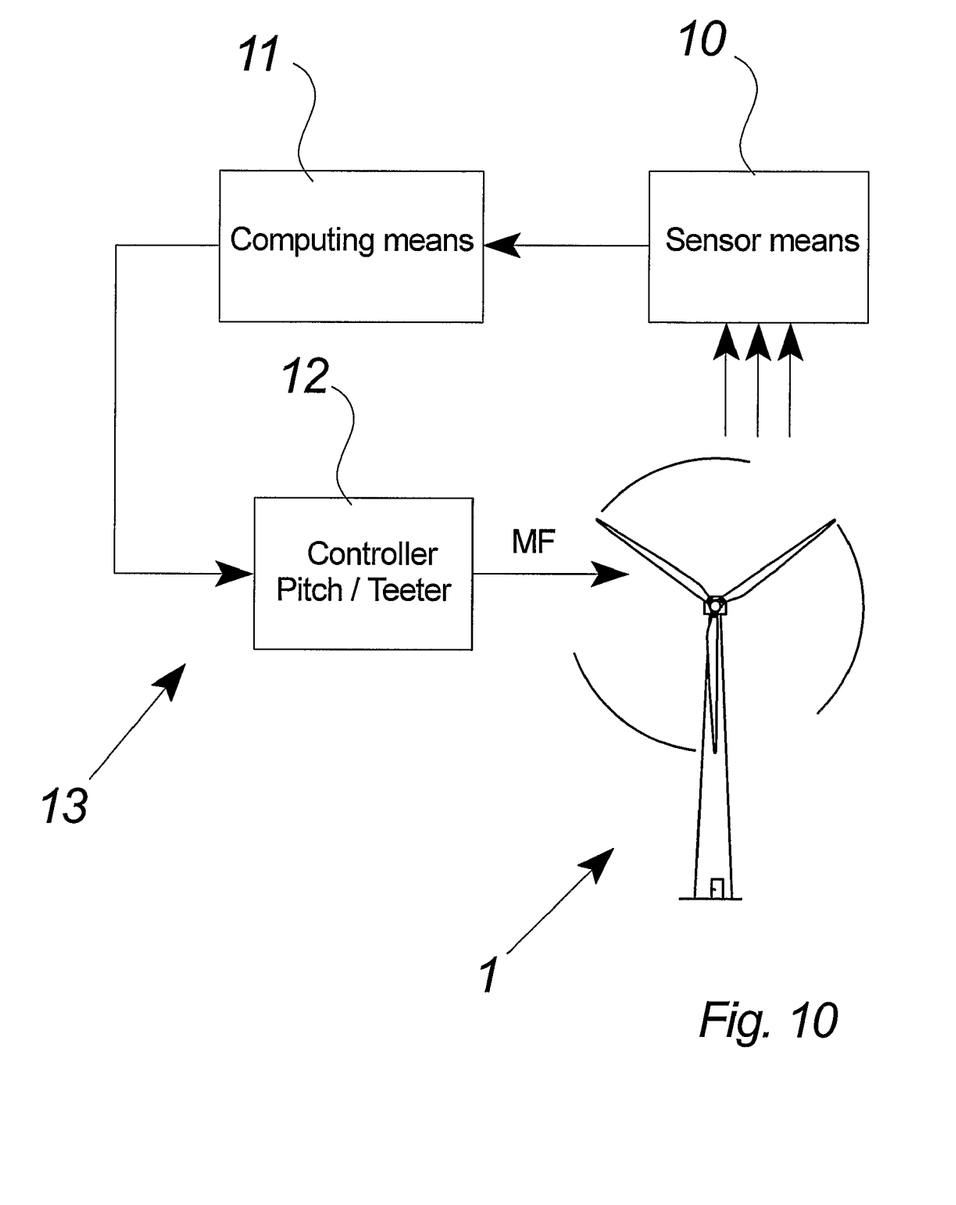
FIG. 10 illustrates schematically a preferred embodiment of a control system for controlling the wind turbine blades during a stopping process.

FIG. 10 illustrates schematically a preferred embodiment of a control system for controlling the wind turbine blades during a stopping process.

Data of the wind turbine 1 and/or the surroundings of the wind turbine are measured with sensor means 11 such as pitch position sensors, blade load sensors, tower load sensors, foundation sensors, azimuth sensors and/or teeter angle sensors. The measured sensor data are supplied to computing means 11 in order to convert the data to a feedback signal. The feedback signal is used in the controller 12 for controlling the pitch by establishing control values MF for controlling the at least one wind turbine blade 5 within control value limits +MF, −MF. The feedback signal and control values W are considered to be signals which control the blade pitch in such a way that no part of the wind turbine is affected by overloads during a stopping process, e.g., in extreme situations such as loss of utility grid or high wind situations.

The control values may preferably be force and/or torque values.

The computing means 11 preferably includes a microprocessor and computer storage means for pre-established limit values of said control values to be compared with the present control values MF. By continuously comparing the present control values with the pre-established values in a closed feedback loop it is possible to optimize the control values to (substantially) to control the rotor at the design limits of the wind turbine and especially the design limits of the wind turbine blades.

The invention has been exemplified above with reference to specific examples of a wind turbine with a control system for controlling the wind turbine blades during the stopping process. However, it should be understood that the invention is not limited to the particular examples described above but may be designed and altered in a multitude of varieties within the scope of the invention as specified in the claims, e.g., in using other measuring data as a supplement or instead of the abovementioned such as temperature measurements in the relevant components of the wind turbines.

What is claimed is:

1. A method of controlling at least one wind turbine blade during a stopping process of a rotor in a wind turbine system during extreme situations, comprising:
   optimizing a pitch velocity of the at least one wind turbine blade to a position of no-acceleration force ($f_{acc}$) applied to the rotor in response to one or more feedback values of the wind turbine system and/or surroundings of the wind turbine system; and
   controlling the pitch velocity with a lower succeeding velocity.

2. The method according to claim 1, wherein pitch angles of the at least one wind turbine blade are controlled individually during every rotation of the rotor in order to obtain a substantially common force on the rotor.

3. The method according to claim 1, wherein the controlling includes a closed loop configuration with the feedback values being established by measuring mechanical or physical data of the wind turbine system and/or the surroundings of the wind turbine system.

4. The method according to claim 3, wherein measuring mechanical or physical data comprises measuring data of at least one of pitch position, blade load, tower load, foundation load, teeter angle, azimuth, friction of blade bearings, wind speed, wind direction, wind shear and/or wind density.

5. The method according to claim 1, wherein the one or more feedback values result in control values (MF) for controlling the at least one wind turbine blade within control limit values (−MF, +MF).

6. The method according to claim 1, where the pitch angles of the at least one wind turbine blade are controlled in relation to a cyclic or a similar non-linear curve during every rotation of the rotor.

7. A method of controlling at least one wind turbine blade during a stopping process of a rotor in a wind turbine system during extreme situations, comprising:
   optimizing a pitch velocity of the at least one wind turbine blade to a position of no-acceleration force ($f_{acc}$) applied to the rotor in response to one or more feedback values of the wind turbine system and/or surroundings of the wind turbine system; and controlling the pitch velocity with a lower succeeding velocity,
wherein the pitch velocity is controlled in relation to a non-linear curve with a high initial slope.

8. The method according to claim 7, wherein the controlling of the pitch velocity comprises a high initial transient from 0 to about 15 degrees/sec in the first few seconds.

9. A control system for controlling at least one wind turbine blade during a stopping process of a rotor in a wind turbine system, comprising:
a sensor to measure one or more values of the wind turbine system and/or surroundings of the wind turbine system,
computing device to establish one or more feedback values of the measured values, and
a controller to control the at least one wind turbine blade wherein said controller is adapted to optimize a pitch velocity of the at least one wind turbine blade to a position of no-acceleration force ($f_{acc}$) applied to the rotor in response to the one or more feedback values, and to control the pitch velocity with a lower succeeding velocity.

10. The control system according to claim 9, wherein said sensor includes at least one of pitch position sensors, blade load sensors, azimuth sensors, wind sensors, and/or teeter angle sensors for measuring mechanical or physical data of the wind turbine system and/or the surroundings of the wind turbine system.

11. The control system according to claim 9, wherein the control system includes a closed loop configuration in order to establish the one or more feedback values.

12. The control system according to claim 9, wherein said controller is adapted to control the pitch velocity with a high initial transient from 0 to about 15 degrees/sec in the first few seconds.

13. The control system according to claim 9, wherein the system is adapted to control the at least one wind turbine blade within control limit values (−MF, +MF).

14. The control system according to claim 9, wherein said controller comprises pitch algorithms adapted to control the pitch angles of the at least one wind turbine blade individually during every rotation of the rotor in order to obtain a substantially common force on the rotor.

15. The control system according to claim 9, wherein said controller comprises pitch algorithms adapted to control the pitch angles of the at least one wind turbine blade in relation to a cyclic or a similar non-linear curve during every rotation of the rotor.

16. A control system for controlling at least one wind turbine blade during a stopping process of a rotor in a wind turbine system, comprising:
a sensor to measure one or more values of the wind turbine system and/or surroundings of the wind turbine system,
a computing device to establish one or more feedback values of the measured values, and
a controller to control the at least one wind turbine blade wherein said controller is adapted to optimize a pitch velocity of the at least one wind turbine blade to a position of no-acceleration force ($f_{acc}$) applied to the rotor in response to the one or more feedback values, and to control the pitch velocity with a lower succeeding velocity,
wherein said controller is adapted to control the pitch velocity in relation to a non-linear curve with a high initial slope.

17. A wind turbine, comprising:
a rotor having at least one pitch or active stall wind turbine blade;
a pitch actuator system for changing a pitch angle of the at least one with turbine blade; and
a control system for controlling the pitch actuator system and the pitch angle of said at least one wind turbine blade, the control system comprising:
a sensor to measure one or more values of the wind turbine and/or surroundings of the wind turbine,
a computing device to establish one or more feedback values of the measured values, and
a controller to control said at least one wind turbine blade wherein said controller is adapted to optimize a pitch velocity of said at least one wind turbine blade to a position of no-acceleration force ($f_{acc}$) applied to said rotor in response to the one or more feedback values, and to control the pitch velocity with a lower succeeding velocity,
wherein said controller is adapted to control the pitch velocity in relation to a non-linear curve with a high initial slope.

18. The wind turbine according to claim 17 wherein said pitch actuator system includes electric motors controlling the pitch angle of said at least one wind turbine blade.

19. The wind turbine according to claim 17, wherein said wind turbine comprises a rotor teeter mechanism.

* * * * *